US008252254B2

(12) United States Patent
Choi et al.

(10) Patent No.: US 8,252,254 B2
(45) Date of Patent: Aug. 28, 2012

(54) PROCESS FOR REDUCED ALKALI CONSUMPTION IN THE RECOVERY OF SILVER

(75) Inventors: Yeonuk Choi, Oakville (CA); Peter D. Kondos, Toronto (CA); Jacques McMullen, Oakville (CA)

(73) Assignee: Barrick Gold Corporation, Toronto (CA)

( * ) Notice: Subject to any disclaimer, the term of this patent is extended or adjusted under 35 U.S.C. 154(b) by 577 days.

(21) Appl. No.: 11/761,103

(22) Filed: Jun. 11, 2007

(65) Prior Publication Data

US 2007/0292326 A1    Dec. 20, 2007

Related U.S. Application Data

(60) Provisional application No. 60/814,274, filed on Jun. 15, 2006.

(51) Int. Cl.
*C01G 3/10* (2006.01)

(52) U.S. Cl. ............... 423/45; 423/36; 423/146; 75/733; 75/744

(58) Field of Classification Search .................... 423/24, 423/45, 146, 147, 166; 75/744, 733
See application file for complete search history.

(56) References Cited

U.S. PATENT DOCUMENTS

| | | |
|---|---|---|
| 52,325 A | 1/1866 | Scherpf |
| 748,662 A | 1/1904 | Sebillot |
| 1,308,639 A | 7/1919 | Newdick |
| 1,413,724 A | 4/1922 | Groch |
| 1,461,807 A | 7/1923 | Silver |
| 1,745,291 A | 1/1930 | Bleil |
| 1,890,934 A | 12/1932 | Carlson |
| 2,147,009 A | 2/1939 | Chapman |
| 2,234,140 A | 3/1941 | Falconer et al. |
| 2,315,187 A | 3/1943 | Chapman |
| 2,470,707 A | 5/1949 | Herrmann |
| 2,476,420 A | 7/1949 | Krebs |
| 2,478,652 A | 8/1949 | Byler et al. |
| 2,479,930 A | 8/1949 | Herkenhoff |
| 2,502,490 A | 4/1950 | Sweet |
| 2,519,770 A | 8/1950 | Kramer |
| 2,545,239 A | 3/1951 | McQuiston, Jr. et al. |
| 2,579,531 A | 12/1951 | Zadra |
| 2,588,450 A | 3/1952 | Zadra |
| 2,612,470 A | 9/1952 | Griess, Jr. et al. |
| 2,646,346 A | 7/1953 | Coplan et al. |
| 2,646,347 A | 7/1953 | Jacks et al. |
| 2,658,827 A | 11/1953 | Rizo-Patron |
| 2,679,982 A | 6/1954 | Thyle |

(Continued)

FOREIGN PATENT DOCUMENTS

AR     001403     10/1997

(Continued)

OTHER PUBLICATIONS

U.S. Appl. No. 11/558,639, filed Nov. 10, 2006, Choi.

(Continued)

*Primary Examiner* — Melvin C Mayes
*Assistant Examiner* — Pritish Darji
(74) *Attorney, Agent, or Firm* — Sheridan Ross P.C.

(57) ABSTRACT

The present invention is directed to a precious metal recovery process in which basic ferric sulphates and/or jarosites are controlled by hot curing of the autoclave discharge slurry followed by decomposition of argentojarosite using strong acid consumers.

32 Claims, 4 Drawing Sheets

U.S. PATENT DOCUMENTS

| | | |
|---|---|---|
| 2,726,934 A | 12/1955 | Forward et al. |
| 2,767,965 A | 10/1956 | Daman |
| 2,777,764 A | 1/1957 | Hedley et al. |
| 2,804,379 A | 8/1957 | Wistrich et al. |
| 2,827,372 A | 3/1958 | Britton |
| 2,836,490 A | 5/1958 | Mackiw et al. |
| 2,845,936 A | 8/1958 | Boynton et al. |
| 2,867,529 A | 1/1959 | Forward et al. |
| 2,871,116 A | 1/1959 | Clark |
| 2,893,846 A | 7/1959 | Wistrich et al. |
| 2,919,802 A | 1/1960 | Drake |
| 2,928,661 A | 3/1960 | MacLaren |
| 2,937,078 A | 5/1960 | Dukes et al. |
| 2,954,290 A | 9/1960 | Teichmann et al. |
| 2,989,380 A | 6/1961 | Weiss et al. |
| 3,010,803 A | 11/1961 | Wistrich et al. |
| 3,010,804 A | 11/1961 | Wistrich et al. |
| 3,013,866 A | 12/1961 | Samaniego et al. |
| 3,018,170 A | 1/1962 | Soloducha |
| 3,054,230 A | 9/1962 | Logue |
| 3,088,820 A | 5/1963 | Mackiw et al. |
| 3,130,015 A | 4/1964 | Monroe |
| 3,174,848 A | 3/1965 | Bruce |
| 3,206,288 A | 9/1965 | Hazen et al. |
| 3,215,611 A | 11/1965 | Pawick et al. |
| 3,264,099 A | 8/1966 | Johnson |
| 3,264,699 A | 8/1966 | Knowlton |
| 3,266,872 A | 8/1966 | Terao et al. |
| 3,285,705 A | 11/1966 | Zuiderweg et al. |
| 3,293,027 A | 12/1966 | Mackiw et al. |
| 3,322,505 A | 5/1967 | Weber |
| 3,357,823 A | 12/1967 | Tuwiner |
| 3,414,245 A | 12/1968 | Frazer |
| 3,440,256 A | 4/1969 | Rich |
| 3,463,710 A | 8/1969 | Lower |
| 3,477,928 A | 11/1969 | Coltrinari |
| 3,522,018 A | 7/1970 | Bachmann et al. |
| 3,523,762 A | 8/1970 | Broughton |
| 3,529,026 A | 9/1970 | Blumcke et al. |
| 3,537,824 A | 11/1970 | Schmidt |
| 3,547,589 A | 12/1970 | Rice et al. |
| 3,547,813 A | 12/1970 | Robinson et al. |
| 3,547,814 A | 12/1970 | McWhirter |
| 3,549,351 A | 12/1970 | Lundquist |
| 3,574,600 A | 4/1971 | Scholmer et al. |
| 3,599,601 A | 8/1971 | Ishikawa |
| 3,615,260 A | 10/1971 | Hanson |
| 3,639,925 A | 2/1972 | Scheiner et al. |
| 3,660,277 A | 5/1972 | McWhirter et al. |
| 3,670,887 A | 6/1972 | McWhirter |
| 3,672,873 A | 6/1972 | Huggins et al. |
| 3,687,635 A | 8/1972 | Wijard et al. |
| 3,692,763 A | 9/1972 | Van Saane et al. |
| 3,743,501 A | 7/1973 | Cusanelli et al. |
| 3,761,566 A | 9/1973 | Michal |
| 3,772,188 A | 11/1973 | Edwards |
| 3,809,549 A | 5/1974 | Opratko et al. |
| 3,840,365 A | 10/1974 | Hammes et al. |
| 3,846,124 A | 11/1974 | Guay |
| 3,867,268 A | 2/1975 | Kawulka et al. |
| 3,879,270 A | 4/1975 | Kowalski |
| 3,909,248 A | 9/1975 | Ryan et al. |
| 3,914,162 A | 10/1975 | Kowalski |
| 3,935,006 A | 1/1976 | Fischer |
| 3,954,450 A | 5/1976 | Kuhn et al. |
| 3,954,606 A | 5/1976 | Block et al. |
| 3,960,717 A | 6/1976 | Wyatt |
| 3,961,908 A | 6/1976 | Touro |
| 3,962,402 A | 6/1976 | Touro |
| 3,997,445 A | 12/1976 | Hannestad |
| 4,004,991 A | 1/1977 | Veltman et al. |
| 4,007,120 A | 2/1977 | Bowen |
| 4,022,866 A | 5/1977 | Kuhn et al. |
| 4,029,736 A | 6/1977 | Melkonian |
| 4,038,362 A | 7/1977 | Guay |
| 4,044,096 A | 8/1977 | Queneau et al. |
| 4,052,151 A | 10/1977 | Reichrt et al. |
| 4,053,305 A | 10/1977 | Smyres et al. |
| 4,056,261 A | 11/1977 | Darrah |
| 4,070,182 A | 1/1978 | Genik-Sas-Berezowsky et al. |
| 4,080,287 A | 3/1978 | Conway et al. |
| 4,085,266 A | 4/1978 | Nakai et al. |
| 4,094,668 A | 6/1978 | Yannopoulos et al. |
| 4,097,271 A | 6/1978 | Swinkels et al. |
| 4,123,600 A | 10/1978 | Kita et al. |
| 4,124,462 A | 11/1978 | Reinhardt et al. |
| 4,126,757 A | 11/1978 | Smith, Jr. et al. |
| 4,135,918 A | 1/1979 | Ettel et al. |
| 4,149,880 A | 4/1979 | Prater et al. |
| 4,153,522 A | 5/1979 | Arbiter et al. |
| 4,167,470 A | 9/1979 | Karnofsky |
| 4,188,208 A | 2/1980 | Guay |
| 4,193,970 A | 3/1980 | Seton et al. |
| 4,219,354 A | 8/1980 | Rastas et al. |
| 4,249,032 A | 2/1981 | Smith, Jr. et al. |
| 4,252,924 A | 2/1981 | Chatterjee |
| 4,259,107 A | 3/1981 | Guay |
| 4,265,739 A | 5/1981 | Dalton |
| 4,266,972 A | 5/1981 | Redondo-Abad et al. |
| 4,267,069 A | 5/1981 | Davidson et al. |
| 4,269,622 A | 5/1981 | Kerley, Jr. |
| 4,279,867 A | 7/1981 | Weir |
| 4,279,868 A | 7/1981 | Von Kohorn |
| 4,289,532 A | 9/1981 | Matson et al. |
| 4,298,379 A | 11/1981 | Zambrano |
| 4,304,644 A | 12/1981 | Victorovich et al. |
| 4,321,236 A | 3/1982 | Stambaugh et al. |
| 4,331,635 A | 5/1982 | Arbiter et al. |
| 4,352,574 A | 10/1982 | Gjelsvik |
| 4,369,061 A | 1/1983 | Kerley, Jr. |
| 4,372,918 A | 2/1983 | Woods et al. |
| 4,374,101 A | 2/1983 | Lussiez et al. |
| 4,384,889 A | 5/1983 | Wiewiorowski et al. |
| 4,399,109 A | 8/1983 | Iler et al. |
| 4,415,542 A | 11/1983 | Queneau et al. |
| 4,423,011 A | 12/1983 | Baglin et al. |
| 4,431,613 A | 2/1984 | Verbaan |
| T104,001 I4 | 3/1984 | Kunter et al. |
| 4,436,702 A | 3/1984 | Schulz et al. |
| 4,437,953 A | 3/1984 | Newman et al. |
| 4,438,076 A | 3/1984 | Pietsch et al. |
| 4,442,072 A | 4/1984 | Baglin et al. |
| 4,501,721 A | 2/1985 | Sherman et al. |
| 4,507,274 A | 3/1985 | Broecker et al. |
| 4,517,262 A | 5/1985 | Beidler |
| 4,528,166 A | 7/1985 | McDougall |
| 4,551,213 A | 11/1985 | Wilson |
| 4,552,589 A | 11/1985 | Mason et al. |
| 4,557,905 A | 12/1985 | Sherman et al. |
| 4,559,209 A | 12/1985 | Muir et al. |
| 4,571,262 A | 2/1986 | Kerfoot et al. |
| 4,571,263 A | 2/1986 | Weir et al. |
| 4,571,264 A | 2/1986 | Weir et al. |
| 4,578,163 A | 3/1986 | Kunter et al. |
| 4,587,110 A | 5/1986 | Potter et al. |
| 4,592,779 A | 6/1986 | Russ et al. |
| 4,594,102 A | 6/1986 | Weir et al. |
| 4,595,566 A | 6/1986 | Byrd et al. |
| 4,595,572 A | 6/1986 | Ogass et al. |
| 4,605,439 A | 8/1986 | Weir |
| 4,605,537 A | 8/1986 | Touro |
| 4,606,763 A | 8/1986 | Weir |
| 4,606,766 A | 8/1986 | Genik-Sas-Berezowsky et al. |
| 4,610,724 A | 9/1986 | Weir et al. |
| 4,615,731 A | 10/1986 | Thomas et al. |
| 4,629,502 A | 12/1986 | Sherman et al. |
| 4,632,701 A | 12/1986 | Genik-Sas-Berezowsky et al. |
| 4,647,307 A | 3/1987 | Raudsepp et al. |
| 4,654,078 A | 3/1987 | Perez et al. |
| 4,661,321 A | 4/1987 | Byrd et al. |
| 4,723,998 A | 2/1988 | O'Neil |
| 4,738,718 A | 4/1988 | Bakshani et al. |
| 4,765,827 A | 8/1988 | Clough et al. |
| 4,801,329 A | 1/1989 | Clough et al. |
| 4,816,235 A | 3/1989 | Pesic |
| 4,898,672 A | 2/1990 | Clifft et al. |
| 4,902,345 A | 2/1990 | Ball et al. |

| | | |
|---|---|---|
| 4,923,510 A | 5/1990 | Ramadorai et al. |
| 4,925,485 A | 5/1990 | Schulze |
| 4,960,584 A | 10/1990 | Brown |
| 4,968,008 A | 11/1990 | Emmett, Jr. et al. |
| 4,974,816 A | 12/1990 | Emmett, Jr. et al. |
| 4,979,987 A | 12/1990 | Mason et al. |
| 5,046,587 A | 9/1991 | Jones |
| 5,046,856 A | 9/1991 | McIntire |
| 5,071,477 A | 12/1991 | Thomas et al. |
| 5,078,786 A | 1/1992 | Peters et al. |
| 5,114,687 A | 5/1992 | Han et al. |
| 5,127,942 A | 7/1992 | Brierley et al. |
| 5,136,784 A | 8/1992 | Marantz |
| 5,159,761 A | 11/1992 | Cagan et al. |
| 5,215,575 A | 6/1993 | Butler |
| 5,223,024 A | 6/1993 | Jones |
| 5,232,491 A | 8/1993 | Corrans et al. |
| 5,236,492 A | 8/1993 | Shaw et al. |
| 5,256,189 A | 10/1993 | Patel et al. |
| 5,286,457 A | 2/1994 | Woodson et al. |
| 5,354,359 A | 10/1994 | Wan et al. |
| 5,458,315 A | 10/1995 | Blatz et al. |
| 5,458,866 A | 10/1995 | Simmons |
| 5,488,779 A | 2/1996 | Schultheis et al. |
| 5,489,326 A | 2/1996 | Thomas et al. |
| 5,535,992 A | 7/1996 | Krause |
| 5,536,297 A | 7/1996 | Marchbank et al. |
| 5,536,480 A | 7/1996 | Simmons |
| 5,575,981 A | 11/1996 | Krause |
| 5,610,575 A | 3/1997 | Gioutsos |
| 5,628,431 A | 5/1997 | Roach et al. |
| 5,698,170 A | 12/1997 | King |
| 5,717,116 A | 2/1998 | Saito et al. |
| 5,855,858 A | 1/1999 | Jones |
| 5,902,474 A | 5/1999 | Jones |
| 5,917,116 A | 6/1999 | Johnson |
| 5,919,674 A | 7/1999 | Tunley |
| 5,956,260 A | 9/1999 | Heger et al. |
| 6,002,974 A | 12/1999 | Schiffmann |
| 6,080,300 A | 6/2000 | Goodwin |
| 6,183,706 B1 | 2/2001 | King |
| D444,286 S | 6/2001 | Ahne |
| 6,268,794 B1 | 7/2001 | Tzanev |
| 6,299,776 B1 | 10/2001 | McWhirter et al. |
| 6,368,381 B1 | 4/2002 | King et al. |
| 6,395,063 B1 | 5/2002 | Cole |
| 6,456,194 B1 | 9/2002 | Carlson et al. |
| 6,497,745 B2 | 12/2002 | Marsden et al. |
| 6,526,668 B1 | 3/2003 | Beckhart et al. |
| 6,576,041 B2 | 6/2003 | Cole |
| 6,641,642 B2 | 11/2003 | Simmons et al. |
| 6,660,059 B2 | 12/2003 | Ji et al. |
| 6,680,035 B2 | 1/2004 | Arroyo et al. |
| 6,835,230 B2 | 12/2004 | Kanno et al. |
| 6,836,972 B2 | 1/2005 | Drahos et al. |
| 6,888,034 B1 | 5/2005 | Landray et al. |
| 7,033,480 B2 | 4/2006 | King |
| 7,037,357 B2 | 5/2006 | Ahern et al. |
| 7,040,603 B1 | 5/2006 | Tai et al. |
| 7,066,983 B2 | 6/2006 | Ji et al. |
| 7,226,057 B2 | 6/2007 | Eichhorn et al. |
| 7,285,256 B2 | 10/2007 | Wan et al. |
| 7,329,396 B2 | 2/2008 | Harris et al. |
| 2002/0020252 A1 | 2/2002 | Dorlac et al. |
| 2002/0028164 A1 | 3/2002 | Schutte et al. |
| 2002/0152845 A1 | 10/2002 | Fleming et al. |
| 2004/0115108 A1* | 6/2004 | Hackl et al. ............ 423/22 |
| 2004/0188334 A1 | 9/2004 | McWhirter et al. |
| 2004/0206207 A1 | 10/2004 | Ji et al. |
| 2006/0133974 A1* | 6/2006 | Ji et al. ............ 423/36 |
| 2006/0228279 A1 | 10/2006 | Campbell et al. |
| 2007/0022843 A1 | 2/2007 | Bax et al. |
| 2007/0089566 A1 | 4/2007 | Hackl et al. |
| 2008/0050293 A1 | 2/2008 | Dreisinger et al. |
| 2009/0019970 A1 | 1/2009 | Ritchie et al. |
| 2010/0024603 A1 | 2/2010 | Ji et al. |

FOREIGN PATENT DOCUMENTS

| | | |
|---|---|---|
| AR | 010059 | 5/2000 |
| AR | 016622 | 7/2001 |
| AR | 034157 | 2/2004 |
| AR | 046395 | 12/2005 |
| AU | 2004285993 | 5/2005 |
| CL | 35268 | 4/1986 |
| CL | 2998-01 | 4/2002 |
| CL | 278-02 | 11/2002 |
| CL | 1045-04 | 6/2005 |
| DE | 3808154 | 9/1989 |
| DE | 4336922 | 5/1995 |
| DE | 102004003952 | 8/2004 |
| DE | 10354888 | 6/2005 |
| EP | 0430813 | 6/1991 |
| GB | 1491651 | 11/1977 |
| GB | 1491851 | 11/1977 |
| GB | 1514794 | 6/1978 |
| JP | S58-035922 | 3/1983 |
| RU | 37700 | 7/1934 |
| RU | 37700 | 5/2004 |
| WO | WO 91/11539 | 8/1991 |
| WO | WO 96/29439 | 9/1996 |
| WO | WO 02/27045 | 4/2002 |
| WO | WO 02/070756 | 9/2002 |
| WO | WO 03/060172 | 7/2003 |
| WO | WO 2005/007902 | 1/2005 |
| WO | WO 2005/042790 | 5/2005 |

OTHER PUBLICATIONS

"Final Results From Farallon's Metallurgical Test Program Confirm Precious Metals Recoveries for Campo Morado", available at farallonresources.com/i/pdf/FAN__2005-12-15__NR.pdf, Dec. 15, 2005, 7 pages.

Design & Commissioning of the Macres Pressure Oxidation Circuit; by T. Giraudo, M. D. Cadzow, D. J. Lunt and T. W. Quaife, paper presented at Randol, 2000, Vancouver, Canada, Apr. 2000.

Gold & Resource Developments Macraes Gold Project Pressure Oxidation Plant Designed and Constructed by Minproc; MGP Tech Flyer 3.

High Temperature POX of Precious/Base Metal Concentrates From Newmont's Phoenix Project, Using Controlled Precipitation of Sulphate Species to Enhance Silver Recovery; by G. L. Simmons and J. C. Gathje, Pressure Hydrometallurgy 2004, 34th Annual Hydrometallurgy Meeting, Banff, Alberta, Canada.

Increasing the Capacity of Existing and New Exothermic Autoclave Circuits; by G. M. Dunn and H. W. Scriba, Pressure Hydrometallurgy 2004, 34th Annual Hydrometallurgy Meeting, Banff, Alberta, Canada.

Manual of Analytical Methods for the Uranium Concentrating Plant; by J. C. Ingles, Mines Branch Monograph 866, Mines Branch, Department of Mines and Technical Surveys, Ottawa, Canada, 1958, pp. 1-10.

Peacey et al. "Copper Hydrometallurgy—Current Status, Preliminary Economics, Future Direction and Positioning versus Smelting", available at http://www.hatch.ca/non__ferrous/articles/copper__hydrometallurgy.pdf, printed May 17, 2007, 32 pages.

Performance of a New Automatic Carbon Dioxide Coulometer; by E. W. D. Huffman, Jr., Microchemical Jr. 22, pp. 567-573.

Process Principles in Minerals and Materials Production; by P. C. Hayes, Hayes Publishing Co., 52 Dewar Terrace, Sherwood, Queensland, 4075, Australia.

Sage Mill Patent Turns Waste to Ore; by L. W. Cope, ESMJ, Jan. 1998.

Testing and Modelling a Novel Iron Control Concept in a Two-Stage Ferric Leach/Pressure Oxidation Process for the Sepon Copper Project; by K. G. Baxter, A. G. Pavilides, and D. G. Dixon, Pressure Hydrometallurgy 2004, 34th Annual Hydrometallurgy Meeting, Banff, Alberta, Canada.

The Sepon Copper Project: Development of a Flowsheet; by K, Baxter, D. Dreisinger and G. Pratt; vol. 2: Electrometallurgy and Environmental Hydrometallurgy, TMS (The Minerals, Metals & Materials Society), 2003.

Weir et al.; "Precious metals recovery from pressure oxidized Porgera concentrates"; Minerals and Metallurgical Processing, Nov. 1986, 3 pages.

U.S. Appl. No. 11/686,165, filed Mar. 14, 2007, Ji.

Adams et al. "Mixing Optimiation of High Pressure Oxidation of Gold Ore Slurries", Randol Gold & Silver Forum, 1998, p. 217-221.

Dutrizac "Converting jarosite residues into compact hematite products", JOM, Jan. 1990, p. 36-39.

Ekato Pamphlet; "Mixing Update for Gassing Applications: EKATO'S Self-Aspirating Impeller System"; 2 pages, which is believed to have been published in 1997.

Geldart et al. "Hydrothermal processing of Kidd Creek jarosites for stabilization and metal recovery" in Iron Control and Disposal Symposium, Ottawa, 1996, p. 659-674.

Kunda and Veltman "Decomposition of jarosite" Metallurgical Transactions B, vol. 10B, Sep. 1979, p. 439-446.

Examination Report (including translation) for Chilean Patent Application No. 1477-2007, mailed Feb. 12, 2009.

Examination Report (including partial English translation) for Chilean Patent Application No. 1744-2007, mailed Apr. 15, 2010.

International Preliminary Report on Patentability for International (PCT) Patent Application No. PCT/IB2007/004319, mailed Feb. 3, 2011.

Official Action (including translation) for Japanese Patent Application No. 2008-558945, mailed Mar. 8, 2011.

McMullen et al., "Gold Roasting, Autoclaving or Bio-Oxidation Process Selection Based on Bench-Scale and Pilot Plant Test Work and Costs," Mineral Processing Plant Design, Practice, and Control Proceedings, vol. 1, Mular et al., eds., Society for Mining, Metallurgy, and Exploration, Inc., 2002, pp. 211-250.

Partial Translation of Substantive Examination Report for Argentina Patent Application No. P070102619, dated Aug. 23, 2011.

International Search Report for International (PCT) Patent Application No. PCT/IB2007/004319, mailed Aug. 19, 2008.

Written Opinion for International (PCT) Patent Application No. PCT/IB2007/004319, mailed Aug. 19, 2008.

Official Action for Australian Patent Application No. 2007340966, dated Dec. 3, 2010.

Official Action (including translation) for Peruvian Patent Application No. 000753-2007/OIN, dated Nov. 11, 2010.

Notice of Allowance for Australia Patent Application No. 2007340966, dated Jan. 24, 2012.

Official Action for Canada Patent Application No. 2,654,818, dated Nov. 18, 2011, 3 pages.

Official Action for Australia Patent Application No. 2007340966, dated Dec. 16, 2011, 2 pages.

* cited by examiner

PROCESS FOR REDUCED ALKALI CONSUMPTION IN THE RECOVERY OF SILVER

CROSS REFERENCE TO RELATED APPLICATION

The present application claims the benefits of U.S. Provisional Application Ser. No. 60/814,274, filed Jun. 15, 2006, of the same title, which is incorporated herein by this reference.

FIELD OF THE INVENTION

The present invention relates generally to recovery of silver from sulphidic materials and particularly to decomposing basic iron sulphate and/or jarosites after pressure oxidizing precious metal-containing sulphide feed materials.

BACKGROUND OF THE INVENTION

Refractory sulphide ores are now a common source of precious metals. "Refractory" precious metal sulphide ores refer to ores and concentrates having low cyanide leaching efficiency (i.e., gold recovery). In refractory sulphide minerals, the precious metal-bearing sulphides are typically chalcopyrite, pyrite and arsenopyrite. To render refractory precious metal sulphide materials amenable to cyanide leaching, the sulphide matrix is destroyed.

Destruction of the sulphide matrix can be accomplished through a variety of oxidation methods, such as roasting, bacterial leaching, or pressure oxidation. In the pressure oxidation process, the precious metal-bearing sulphide minerals are oxidized in an autoclave at a high temperature (190-230° C.) and super atmospheric pressure while gaseous oxygen is injected into the pulp. Precious metals in the acidic pressure oxidation leach residues are commonly recovered by cyanidation or ammonium thiosulphate leaching. Prior to precious metal recovery, the autoclave discharge is either directly neutralized after cooling or subjected to a solid/liquid separation to remove acid and dissolved metals. If cyanidation is employed, the pH of the pulp must be increased to at least about pH 9.0 to avoid the formation of hydrogen cyanide.

Pressure oxidation reactions for sulphide minerals (pyrite $FeS_2$ and arsenopyrite FeAsS) can be written ideally as:

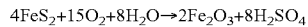

and

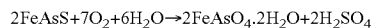

Small amounts of iron and arsenic in the sulphide materials are also converted to the dissolved ferrous iron, ferric iron, arsenite and arsenate. Under these conditions, iron is precipitated in the autoclave as hematite ($Fe_2O_3$) and scorodite ($FeAsO_4.2H_2O$), and sulphuric acid is generated in solution. These two iron compounds are very desirable because they are chemically stable. It is possible to form other stable Fe—As compounds in the autoclave, depending on the temperature, the Fe/As ratio, and the acidity in the autoclave liquor. Because of their chemical stability, these compounds are inert during the subsequent neutralization and cyanidation steps and, therefore, do not consume expensive chemicals, such as lime.

Depending on the chemical conditions prevailing in the autoclave, other less desirable iron compounds can be formed. Examples of such compounds include basic iron sulphate, $FeOHSO_4$, and jarosite, $X Fe_3(SO_4)_2(OH)_6$, where X is typically one of $H_3O^+$, $Na^+$, $K^+$, $NH^+_4$, $½Pb^{2+}$, and $Ag^+$.

Jarosites and basic iron sulphates can be chemically instable. For example, in the autoclave discharge, basic iron sulphate can react with lime during pre-cyanidation neutralization to form ferric hydroxide and calcium sulphate:

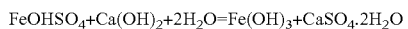

Also, some jarosites, particularly hydronium jarosite, react with lime during pre-cyanidation neutralization, to form ferric hydroxide and calcium sulphate:

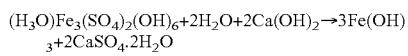

Although satisfactory gold recovery can be obtained by directly treating acidic pressure oxidation leach residues in an appropriate gold leaching and recovery process, silver recovery is frequently very poor. The most probable cause of poor silver recovery is the association of silver with refractory iron compounds (e.g., hematite, basic ferric sulphate, ferric arsenate and various forms of jarosite) formed by the hydrolysis and precipitation reactions that can occur during acidic pressure oxidation. The presence and relative quantities of these compounds can have a major impact on the method and economics of subsequent processes, and largely depends upon the nature of the starting material and the acidic pressure oxidation leach conditions. Generally, pressure oxidation under high acid conditions favours basic iron sulphate and possibly jarosite formation while low acid conditions favour hematite formation. When pressure oxidation is operated under conditions which favour hematite formation, the feed's sulphide sulphur content is converted to free sulphuric acid and dissolved metal sulphates in the solution phase (such as dissolved ferric sulphate), and, if calcium is present, as chemically stable and inert calcium sulphate in the solid phase. Neutralization of the free acid and dissolved sulphate salts in this type of autoclave discharge can be achieved inexpensively with limestone ($CaCO_3$), which is a very cost-effective reagent. When the autoclave is operated under conditions that favour the formation of residues rich in basic iron sulphate and jarosite, it can have a significant negative economic impact on subsequent precious metal recovery operations, particularly the recovery of silver. Precipitates of basic iron sulphate and jarosite cannot be separated physically from the precious metal-containing solids. In addition, adequate neutralization of basic iron sulphate and/or jarosite can only be accomplished with stronger and more expensive neutralization agents, such as lime, CaO, or sodium hydroxide, NaOH.

U.S. Patent Application 2006/0133974, published Jun. 22, 2006, and entitled "Reduction of Lime Consumption When Treating Refractory Gold Ores or Concentrates" teaches the use of a hot curing process, as an effective method, prior to gold leaching, for reducing the cost of neutralizing acid residues from pressure oxidation. In this process, basic iron sulphate and free sulphuric acid, both contained in the autoclave discharge, react to form dissolved ferric sulphate according to the following equation:

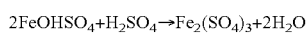

This hot curing process has a residence time of 1 to 24 hours and a preferred temperature range of 85° C. to 95° C. Because the ferric sulphate-containing solution produced can be separated by solid/liquid separation techniques from the precious metal-containing residue, allowing time for basic iron sulphate to convert to dissolved ferric sulphate can reduce the consumption of expensive lime in the neutralization reaction of cyanidation feed in favor of inexpensive limestone. A further benefit of allowing time for the various components of the autoclave discharge to react with one another is that the strong ferric sulphate solution produced can be recovered and recycled to pre-treat the feed to the autoclave. Ferric ions in the recycled solution react with and oxidize sulphides in the autoclave feed material, thereby reducing the requirement and associated expense of oxygen in the autoclave process. In addition, any remaining acid in the recycle solution will react with carbonate minerals, when present in the autoclave feed material, and reduce the subsequent formation of carbon dioxide inside the autoclave and further improve the utilization of oxygen.

While the hot curing process is well suited to the treatment of pressure oxidation residues containing gold, it is less beneficial for the treatment of residues that also contain economically significant levels of silver. In practice, it has been found that the conditions used in the hot curing process favour the conversion of the silver contained in the residue to insoluble precipitates, possibly argentojarosite. The silver associated with this precipitate is extremely refractory to cyanide leach treatment resulting in silver extractions of less than 5 percent.

U.S. Pat. No. 4,632,701 describes an alkaline decomposition process that is an effective means of liberating silver from jarosites contained in pressure oxidation discharge residues, in which the alkali, usually slaked lime, reacts with the jarosites to form an alkali sulphate and an iron oxide, such as goethite. In the case of hydronium jarosite, the reaction with hydrated lime is:

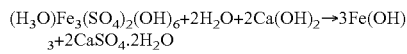

$$(H_3O)Fe_3(SO_4)_2(OH)_6 + 2H_2O + 2Ca(OH)_2 \rightarrow 3Fe(OH)_3 + 2CaSO_4 \cdot 2H_2O$$

Other jarosites, including argentojarosite, also decompose in the presence of alkali. To drive the reaction to the right, the slurry pH of the pressure oxidation residue is increased to pH 10 or pH 10.5, and the slurry maintained at a temperature ranging from 80° C. to 95° C. for a time ranging from 0.5 to 4 hours. If the alkali carbonate step is employed, the total residence time increases to approximately 6 hours. The alkaline slurry is then subjected to a silver recovery treatment, such as cyanidation, without liquid-solids separation.

It has been found that liberating silver from pressure oxidation residues may require uneconomically high lime consumptions, with the cost of the lime far exceeding the value of the silver liberated. Lime requirements of 100 to 200 kg/t of ore are not unusual, and depending on the cost and amount of alkali reagents and the silver grade, the process may not be economically justifiable.

As a result, as of yet, there is no satisfactory process which offers an economic method of recovering silver by pressure oxidation from refractory sulphide ores.

SUMMARY OF THE INVENTION

These and other needs are addressed by the various embodiments and configurations of the present invention. The present invention is directed generally to controlling the levels of solid-phase reactive sulphates (e.g., basic ferric sulphates and jarosites) at various points in a precious metal recovery process and specifically to a process that combines the hot curing of a pressure oxidized slurry to solubilize ferric sulphates with subsequent decomposition of jarosites to provide enhanced levels of gold and silver recovery.

In one embodiment of the present invention, a process is provided that includes the steps of:
(a) oxidizing an aqueous feed slurry in an autoclave, the feed slurry including a silver-containing material and sulphide sulphur, most of the sulphide sulphur being oxidized in the autoclave to sulphate sulphur and some of the sulphate sulphur being in the form of a solid-phase reactive sulphate;
(b) removing, from the autoclave, an aqueous discharge slurry including discharge solids and aqueous discharge liquid, the discharge solids including some of the silver and most of the solid-phase reactive sulphate, and the liquid-phase of the discharge slurry including an acid;
(c) allowing most of the solid-phase reactive sulphate in the aqueous discharge solids to react with the acid to form liquid-phase reactive sulphate, with some of the silver being compounded with solid-phase reactive sulphate;
(d) after step (c), contacting the discharge solids with an acid consumer while maintaining a temperature of the discharge solids of about 80° C. or higher to convert most of the solid-phase reactive sulphate to a non-reactive iron-containing species; and
(e) thereafter recovering most of the silver from the discharge solids.

While not wishing to be bound by any theory, the present invention is based on the discoveries that the temperature and duration of the hot cure step are directly related to the amount of sulphates remaining in the residue, that the sulphate content of the residue is directly related to the amount of basic ferric sulphate in the residue, that silver-containing solid-phase reactive sulphate (e.g., argentojarosite) primarily forms during the hot cure step, that the amount of lime and the temperature required to decompose the silver-containing solid-phase reactive sulphate formed during hot curing depends directly on the sulphate, and not the iron or silver, content of the hot cured residue (with the preferred level of lime consumption often being in excess of the molar equivalent of the sulphate in the hot cured residue), and finally that the relationship between silver recovery and lime consumption is not linear, with the relationship being relatively shallow sloping above a certain level of lime addition. The hot curing step is conducted so that high degrees of conversion of solid-phase reactive sulphate (i.e., basic ferric sulphate) to liquid-phase reactive (ferric) sulphate is realized and, in the solid-phase reactive sulphate decomposition step, only enough lime is contacted with the hot cured residue to realize a selected (economical) degree of silver recovery.

Hot curing reduces the solid-phase reactive sulphate (particularly basic iron sulphate) and sulphate content of the autoclave discharge solids. The negative effect of basic iron sulphate formation on process operating costs can be mitigated by providing the components of the hot discharge slurry from the autoclave with a sufficient time and elevated temperature to react and form solubilized ferric sulphate. A reduction of the levels of basic iron sulphate and solid-phase sulphate reduces significantly the lime demand upon pH adjustment prior to precious metal recovery by minimizing the formation of gypsum or other neutral sulphates.

To recover silver from the hot cured residue, which is typically rendered unrecoverable by conventional lixiviants due to the formation of insoluble silver compounds, the hot cured discharge solids are subjected to a process, known as a lime boil. Typically, the lime boil treats the discharge solids at a temperature of about 90° C. or higher and at a pH greater than about pH 9.

The lime boil is performed to optimize substantially the amount of lime required to decompose solid-phase reactive sulphates. In the hot cure and hot alkali treatment process, the amount of lime required to liberate insoluble silver compounds formed during hot curing is substantially lower than the lime required to liberate insoluble silver species from autoclave residues using conventional lime boiling techniques. This is due not only to reductions in solid-phase reactive sulphate (i.e., basic ferric sulphates) and consequential improvements in lime consumption realized when hot curing precedes hot alkali addition but also the ability to separate liquid-phase reactive sulphate, particularly ferric sulphate, $Fe_2(SO_4)_3$, from the discharge solids before lime boiling is performed. Ideally, little, if any, basic ferric sulphate remains after the hot curing step such that only jarosite in the hot cured residue needs to be decomposed by lime boiling. Removal of most of the basic ferric sulphate prior to lime boiling can provide a dramatic decrease in lime consumption, and the decreased lime consumption produces, relative to a conventional lime boil, a lower viscosity in the lime boiled slurry, thereby facilitating downstream handling of the slurry and its components. The lower viscosity results from the substantial decrease in gypsum production, which is a by-product of solid-phase reactive sulphate (jarosite) decomposition. By way of illustration, it has been discovered that the addition of between about 20 kg/t to about 60 kg/t of alkali to hot cured precious metal containing solids is an effective and economical means of improving silver recovery.

These and other advantages will be apparent from the disclosure of the invention(s) contained herein.

The following definitions are used herein.

"Acid consumer" refers to any material that reacts with sulphuric acid. Acid consumers include bases or any molecular or ionic substance that can combine with a proton (hydrogen ion) to form a new compound. Commonly, a base reacts with (neutralizes) acids to form salts and often water. Exemplary classes of acid consumers include carbonates, oxides and hydroxides of metals. Acid consumers are commonly compounded with sodium, potassium, magnesium, and calcium. Specific examples of acid consumers include carbonates, such as limestone, soda ash, trona, dolomite, and calcite; alkaline earth metal oxides such as lime; other metal oxides such as zinc oxide and magnesium oxide; alkali metal hydroxides such as sodium hydroxide and potassium hydroxide; other metal hydroxides such as ferric hydroxide (e.g., limonite and goethite) and aluminum hydroxides such as laterite, gibbsite, and diaspore; ammonia; and various clays.

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B or C together.

"Autoclave" refers to any reactor that effects oxidation of a reactant under super atmospheric conditions.

"Liquid-phase reactive sulphate" refers to a liquid-phase metal sulphate that is reactive with an acid consumer and specifically includes ferric sulphate.

"Nonreactive iron-containing species" refers to an iron species, such as ferric oxides or hydroxides (e.g., goethite), that is not reactive with an acid consumer.

"Solid-phase reactive sulphate" refers to a solid-phase metal sulphate that is reactive with an acid consumer, such as lime, and specifically includes basic iron sulphate and jarosite.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

An embodiment of a process of the present invention will be discussed with reference to FIGS. 1A-1B. As will be appreciated, the concepts of the present invention can be used in an endless number of other processes and such processes are considered to fall within the scope of the present invention.

Figure 1A:
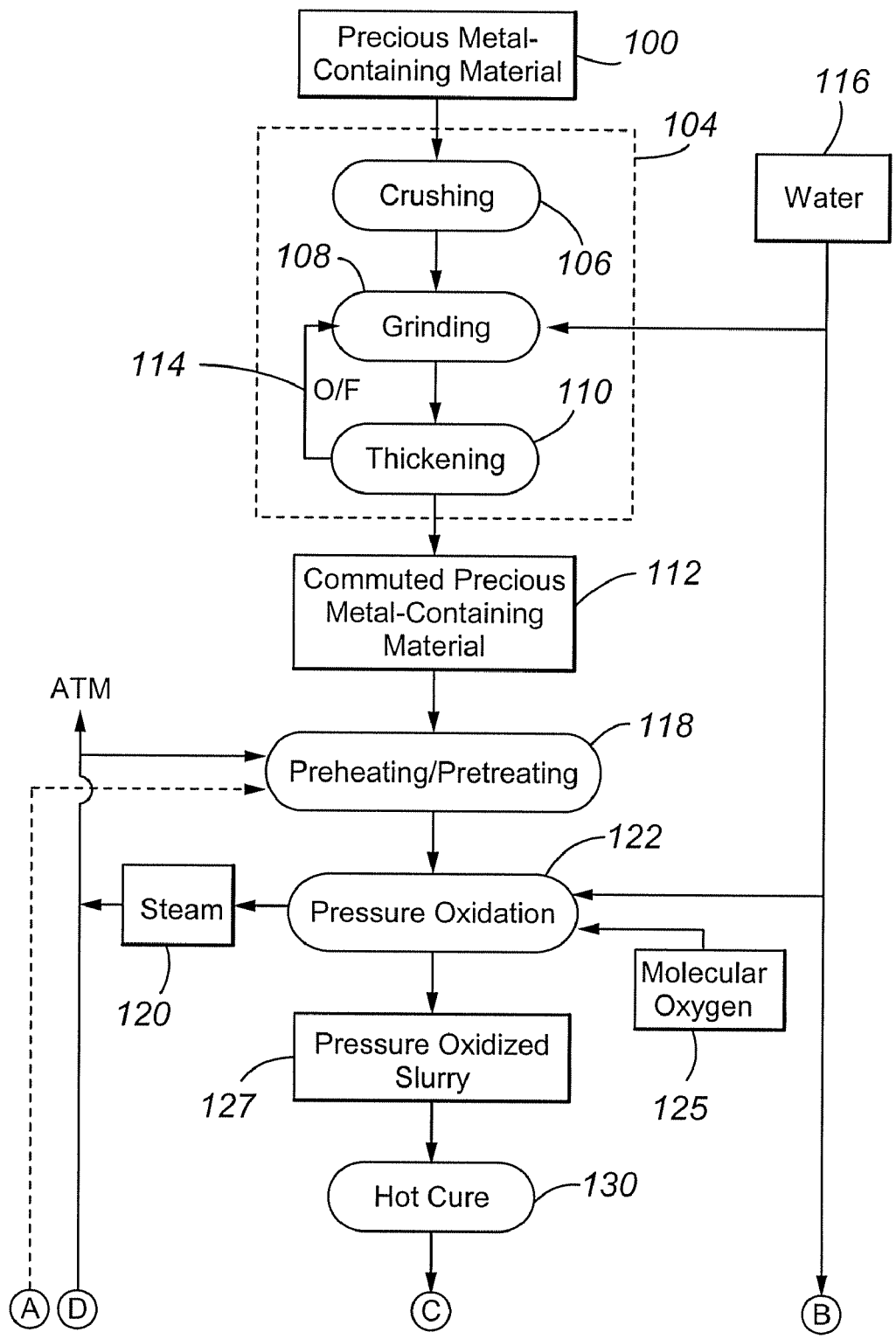
FIGS. 1A and B are flow charts of an embodiment of a precious metal recovery process according to an embodiment of the present invention.
Figure 1B:
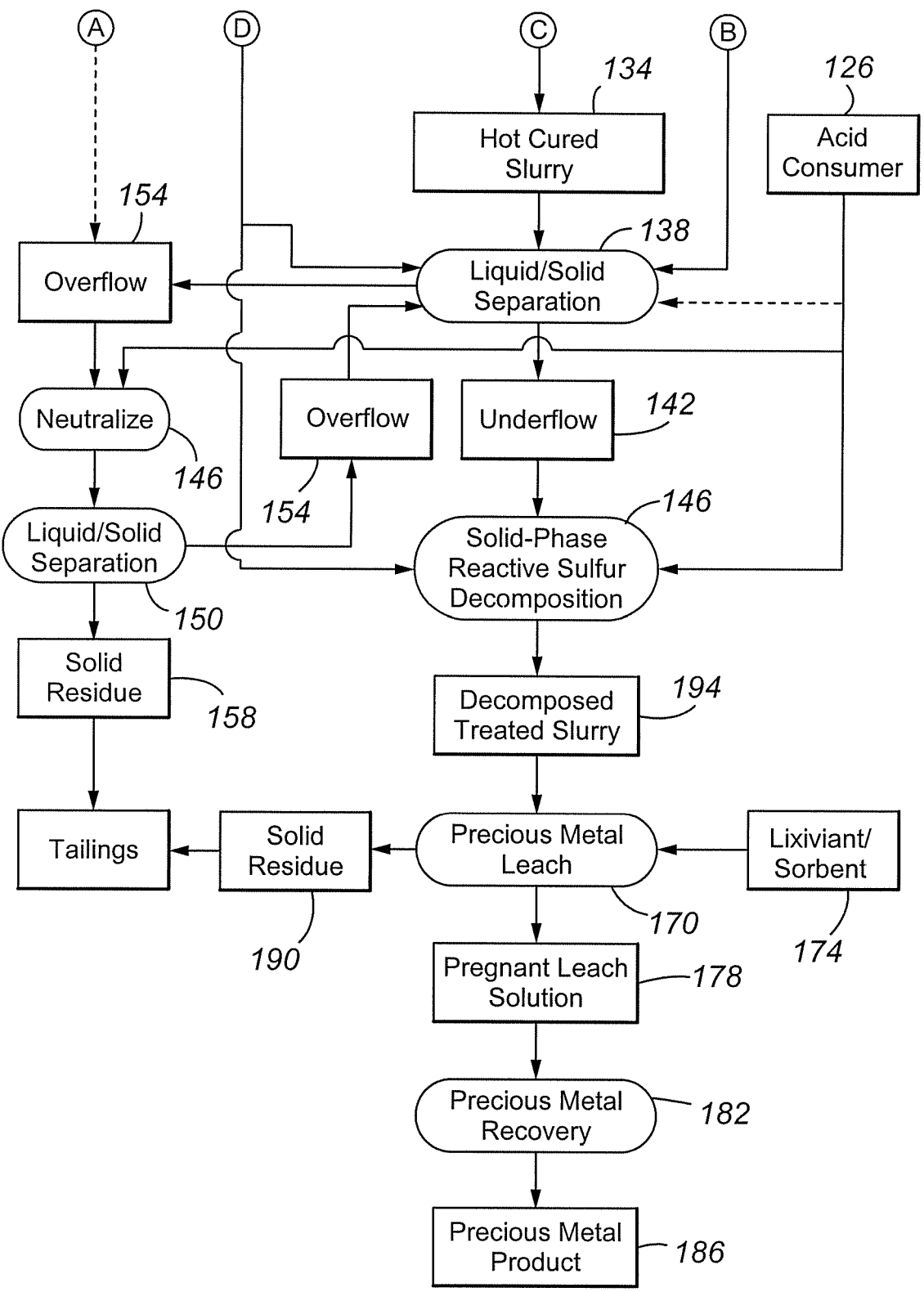

With reference to FIG. 1A, a precious metal-containing material 100 is provided to a comminution circuit 104 and comminuted to a P80 size ranging from about 100 to about 600 mesh (Tyler).

The material 100 is a refractory sulphide material, typically including from about 2 to about 60 wt. % sulphide minerals, from about 1 to about 1000 grams/tonne silver, and from about 1 to about 100 grams/tonne gold. Commonly, the sulphide minerals are predominantly pyrite, realgar, orpiment, chalcopyrite and arsenopyrite, with minor amounts of enargite, pyrrhotite, sphalerite, galena, stibnite, cinnabar, covellite, chalcocite and other commonly occurring sulphide minerals. The silver is typically present in the material 100 as one or more of acanthite, freibergite, polybasite, prousite, pyrargyrite, tetrahedrite, aguilarite, antimonpearceite, argentite, argentopentlandite, argentopyrite, argentiferrous galena, jalpaite, mckinstyrite, miargyrite, pearceite, pyrostilpnite, stephanite, sternbergite, stromeyerite, and xanthoconite.

The comminution circuit 104 typically includes the steps of crushing 106, grinding 108, and thickening 110 to produce a slurried comminuted precious metal-containing material 112, that is typically from about 20 to about 60 wt. % solids. The overflow 114 from the thickening circuit (which is primarily water) is recycled back to the grinding step for reuse. Additional water 116 is added to the grinding device (which is typically a Semi-Autogeneous or SAG, ball mill, high pressure grinding roll or HPGR, or rod mill, or combination of thereof) as needed to provide the desired liquid fraction to the slurry outputted by the grinding step 108. For a low sulphide containing material, flotation may be incorporated after grinding 108 to increase the sulphur content in the autoclave feed. As will be appreciated, there are a large number of other comminution circuit designs and/or components that can be used in the process of the present invention.

The comminuted precious metal-containing material 112 is subjected to a preheating step 118 when processing low-sulphur feeds, in which steam 120 from pressure oxidation 122 is contacted with the material 112 to preheat the material 112 before pressure oxidation 122. Preferably, the material 112 is heated to a temperature of from about 30 to about 115 degrees Celsius with single-stage heating before being inputted to pressure oxidation 122.

Optionally, overflow 154 from the liquid/solid separation step 138 can be recycled and contacted with the material 112 during the preheating/pretreating step 118 to reduce the consumption of oxygen and the production of sulphuric acid in the autoclave during oxidation of the sulphides. The recycled overflow 154 contains dissolved ferric sulphate and free sulphuric acid, which react with the sulphides and carbonates in the material 112. Any remaining free sulphuric acid after the preheating/pretreatment step 118, as well as any ferric sulphate and ferrous sulphate in solution, is preferably neutralized with an acid consumer 126, such as limestone, to precipitate ferric hydroxide and gypsum before the feed material enters the autoclave.

The material 112, after the preheating/pretreating step 118, is inputted as a feed slurry into a multi-compartment autoclave to pressure oxidize at least most and more preferably at least about 90% of the sulphide sulphur in the material 112. Preferably, no more than about 1% of the precious metal in the slurry 118 is solubilized into the liquid phase of the pressure oxidized slurry 127 during pressure oxidation. The autoclave can be operated under conditions to favor formation of hematite or residues rich in basic iron sulphate and possibly jarosite. As will be appreciated, conditions favoring hematite formation include a free acid level of not greater than about 30 grams per liter and preferably ranging from about 5 to about 30 g/l of discharge liquid and an autoclave temperature of at least about 160 degrees Celsius and preferably ranging from about 160 to about 240 degrees Celsius, and conditions favoring basic ferric sulfate and, possibly, jarosite formation include a free acid level greater than 30 grams per liter of discharge liquid and/or an autoclave temperature of less than about 160 degrees Celsius.

After pressure oxidation 122, the pressure oxidized or discharge slurry 127 includes a number of components. It preferably has a free acid concentration of from about 20 to about 50 g/l, a liquid-phase reactive sulphate concentration of from about 30 to about 150 gram/liter, and a solid-phase reactive sulphate concentration of from about 0 to about 15 wt. % of the residue. Typically, the liquid-phase reactive sulphate in the slurry 127 is primarily ferric sulphate, and the solid-phase reactive sulphate is principally in the form of basic ferric sulphate.

The pressure oxidized slurry 127 can be flashed in an open vessel to release pressure and evaporatively cool the slurry 127 through release of steam to form a flashed slurry product.

To convert the solid-phase reactive sulphate to liquid-phase reactive sulphate, the solid phase of the autoclave discharge is maintained, in a hot cure step 130, at a preferred temperature of at least about 60 degrees Celsius, more preferably at least about 85 degrees Celsius, and even more preferably from about 85 to about 120 degrees Celsius, for a time sufficient for most of the solid-phase reactive sulphate to react with the free sulphuric acid in the liquid phase of the autoclave discharge to form liquid-phase reactive sulphate according to the following equation (in which basic ferric sulphate is the solid-phase reactive sulphate and ferric sulphate the liquid-phase reactive sulphate):

$$2Fe(SO_4)(OH)+H_2SO_4=Fe_2(SO_4)_3+2H_2O$$

As can be seen in the above equation, the reaction between basic ferric sulphate and sulphuric acid produces the dissolved ferric sulphate, which can be separated readily from the solid phase in a solid/liquid separation circuit. Moreover, the dissolved ferric sulphate in the separated liquid phase will be readily reacted with limestone during the subsequent neutralization to produce ferric hydroxide.

Figure 2:
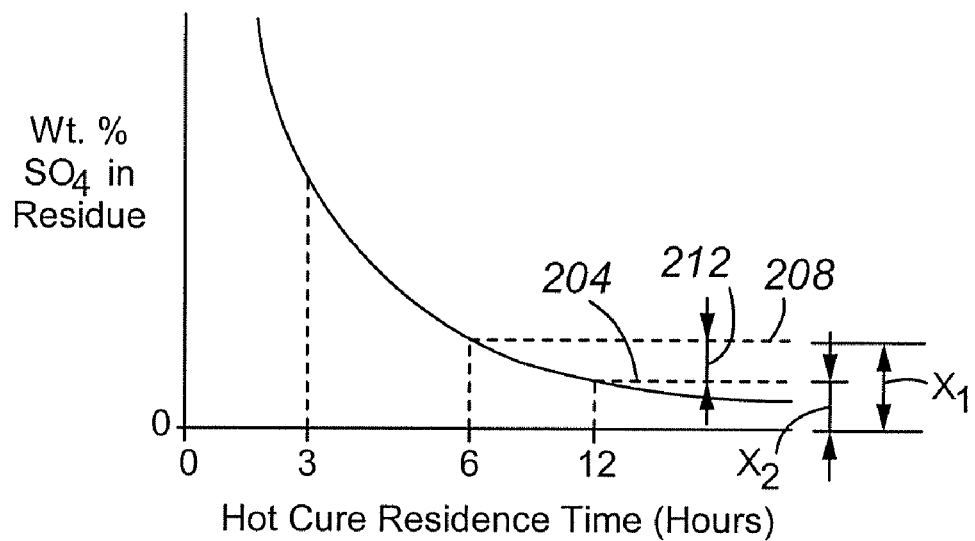
FIG. 2 is a plot of sulfate content in the hot cure residue against hot cure residence time.

The duration of the hot cure step, or the residence time of the solid residue of pressure oxidation 122 in the hot cure step, is a function of several factors. On the one hand, longer residence times typically mean lower plant capacity and higher plant capital and operating costs. On the other hand, longer residence times mean less solid basic ferric sulphates and possibly jarosites to neutralize/decompose with more expensive acid consumers, particularly lime. While not wishing to be bound by any theory, FIG. 2 is believed to depict, for a given hot curing temperature, the relationship between hot cure residence time and the sulphates (e.g., solid basic ferric sulphate) in the residue. The curve 200 is relatively steeply sloping at residence times shorter than about 6 hours and relatively shallowly sloping at residence times longer than about 6 hours, with the curve becoming progressively shallower in slope at longer residence times as the slurry approaches equilibrium. The impact of the residence time on lime consumption is shown, by way of example, by the dashed lines 204 and 208. At a hot cure residence time of 6 hours, dashed line 208 indicates that the remaining basic ferric sulphate in the residue is $X_1$ wt. %, and, at a hot cure residence time of 12 hours, dashed line 204 indicates that the remaining basic ferric sulphate in the residue is $X_2$ wt. %. The difference between $X_1$ and $X_2$, or distance 212, indicates the added lime consumption required for a 6-hour residence time as opposed to a 12-hour residence time. Preferably, the slurry 127 is held in the hot cure step 130 long enough for at least most, more preferably at least about 80%, even more preferably for at least about 90%, and even more preferably for at least about 98% of the solid-phase sulphates (most of which are basic ferric sulphates) to be converted into the liquid-phase sulphates (or dissolved (or soluble) ferric sulphate). Stated another way, the slurry 127 residence time in the hot cure step 130 typically ranges from about 1 to about 24 hours, even more typically from about 6 to about 24 hours, and even more typically from about 10 to about 24 hours. As will be appreciated, higher hot curing temperatures require less residence time for a selected degree of conversion of solid-phase sulphates to liquid-phase sulphates.

The hot cure step 130 is preferably carried out in one or more stirred tank reactors at atmospheric pressure. Although the hot cure reaction is mildly exothermic, preservation of the slurry temperature within hot curing is necessary and may require the adoption of heat conservation measures and/or need steam 120 addition from pressure oxidation 122 to ensure slurry temperature is within the optimal range. After the hot cure step 130 is completed, the hot cured slurry 134 preferably includes from about 10 to about 150 g/l and even more preferably from about 50 to about 150 g/l liquid-phase reactive sulphates (e.g., dissolved ferric sulphate (as $Fe_2(SO_4)_3$)), no more than about 5% wt., more preferably no more than about 2% wt., and even more preferably no more than about 1% wt. solid-phase reactive sulphate (and total sulphates), no more than about 0.5 wt. % basic ferric sulphate, from about 10 to about 50 g/l ferric iron, and from about 10 to about 40 g/l sulphuric acid. Preferably, the temperature of the outputted hot cured slurry 134 typically is at least about 85° C. and more typically ranges from about 70 to about 100° C.

The conversion of basic ferric sulphate to dissolved ferric sulphate is substantially complete. Preferably, at least 80%, more preferably at least about 90%, and even more preferably at least about 98% of the solid-phase reactive sulphates are converted into liquid-phase reactive sulphates, and, of the remaining moles of solid-phase reactive sulphates, commonly at least about 10% are in the form of agentojarosite. For a sufficiently high acid concentration and hot cure temperature, even high input levels of sulphates in the residue are converted substantially completely to dissolved ferric sulphate, when the residence time is sufficiently long. While not wishing to be bound by any theory, it has been observed that the percent conversion is related directly to the sulphate content of the input residue and that, for either high or low sulphate levels in the input residue, substantially complete conversion to dissolved sulphates can be realized economically through hot curing. Thus, the autoclave can be operated under conditions favoring the formation of basic ferric sulphate, and possibly jarosite, and disfavoring the formation of hematite, provided that sufficient acid is present in the output slurry to react, during hot cure and within the selected residence time, substantially completely with the basic ferric sulphate. For example, higher sulphuric acid concentrations in the autoclave favor basic ferric sulphate formation and beneficially provide high acid levels in the outputted slurry.

The slurry 134 is next subjected to liquid-solid separation 138, by any suitable techniques, to remove from the residue dissolved species, such as dissolved ferric sulphate, and sulphuric acid, and produce an underflow 142 including (at least) most of the solid fraction and an overflow 124 including (at least) most of the liquid fraction of the slurry 134. The separated overflow 124 typically includes at least about 90% and more typically at least about 98% of the dissolved ferric iron in the hot cured slurry 134 or at least about 90% and more typically at least about 98% of the dissolved metal sulphates and free sulphuric acid. By contrast, the separated underflow 142 typically includes no more than about 10% and more typically no more than about 2% of the dissolved ferric iron in the hot cured slurry 134 or no more than about 10% and more typically no more than about 2% of the dissolved metal sulphates and free sulphuric acid. The underflow 142 preferably contains no more than about 5 wt. %, more typically no more than about 2 wt. %, and even more typically no more than about 1 wt. % total basic ferric sulphates and/or jarosites in the solid phase. Typically, the overflow 124 contains no more than about 1 wt. % solids.

Figure 4:
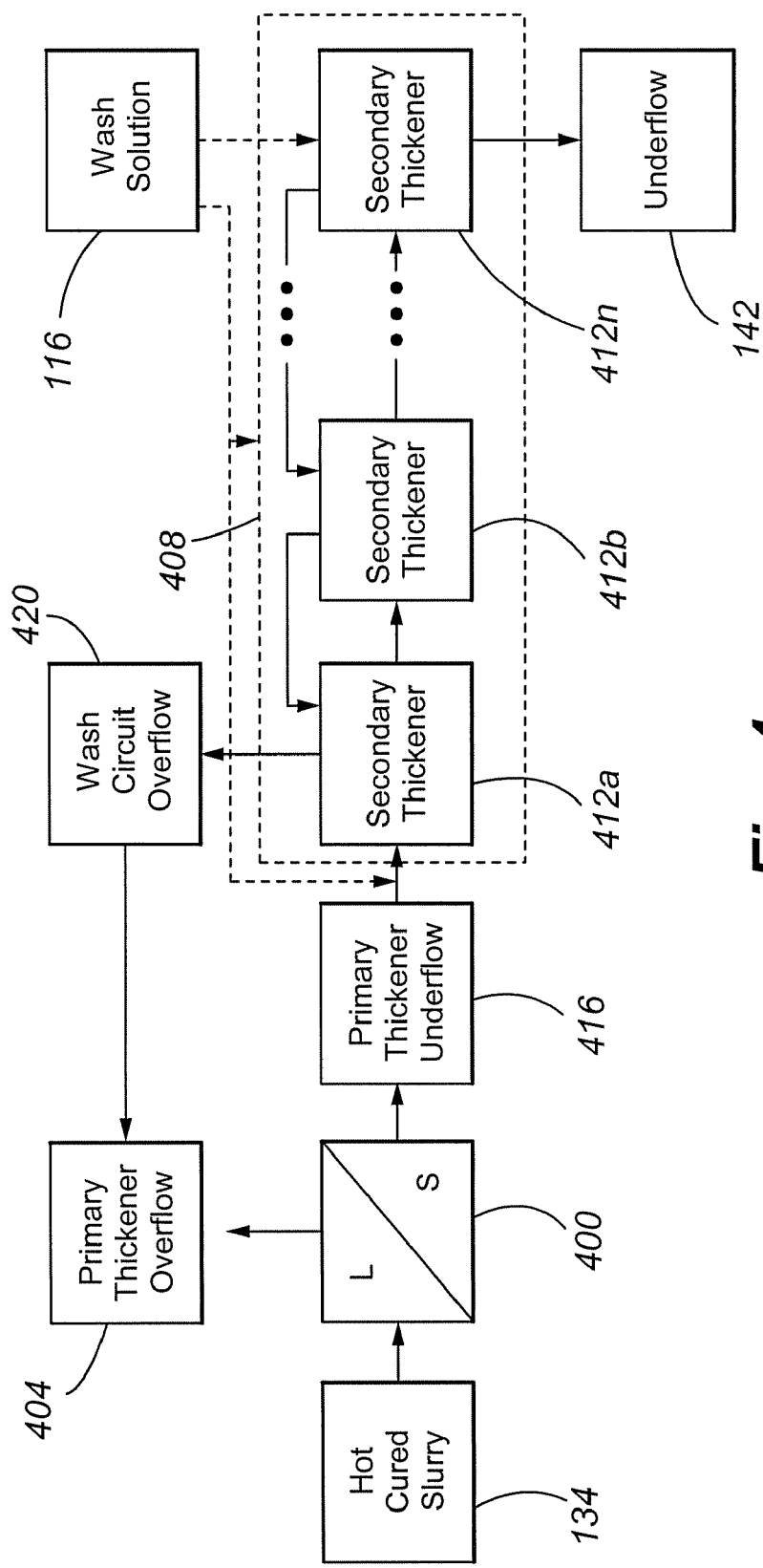
FIG. 4 depicts a thickener circuit according to an embodiment of the present invention.

Preferably, the separation 138 is performed by a number of thickeners series connected in a countercurrent flow configuration. With reference to the example of FIG. 4, the liquid/solid separation step 138 is normally performed in a primary thickener 400, which removes most, and preferably at least about 75%, of the liquid in the slurry 134 as the primary thickener overflow 404. A wash thickener circuit 408, with the secondary thickeners 412a-n in the wash thickener circuit 408 being arranged in countercurrent flow configuration (e.g., in a Counter Current Decantation or CCD configuration), are used to complete liquid/solid separation and repulp the residue in the primary thickener underflow 416. Wash water 116, which may be reclaim water from the tailings pond or other water containing an alkali source, is contacted with the circuit 408 to wash and repulp the solid residue and produce a slurried underflow 142 having a density of from about 15 to about 45% solids and a wash circuit overflow 420. The wash circuit and primary thickener overflows 420 and 404 collectively form the overflow 154. A suitable flocculent may be added to the wash water to improve the effectiveness of solid/liquid separation. The wash thickener circuit 408 preferably has between 2 and 4 thickener stages.

The acid consumer can be added before, during, or after repulping in the wash circuit 408; stated another way, the acid consumer can be added upstream of the wash thickener circuit 408 (and downstream of the primary thickener 400), in the wash thickener circuit 408 (e.g., in the wash water 116 used in the circuit), and/or downstream of the wash thickener circuit 408. In one configuration, the wash water comprises an inexpensive, weak acid consumer, such as limestone, to neutralize a portion, preferably most, more preferably at least about 80%, and even more preferably at least about 90% of the dissolved ferric sulphate and sulphuric acid in the underflow from the primary thickener. This configuration is used where a lower wash efficiency is achieved in the liquid/solid separation step 138. Neutralization of the dissolved ferric sulphate and sulphuric acid before decomposition of the remaining solid-phase reactive sulphate using less expensive acid consumers can reduce the downstream consumption of more expensive acid consumers, particularly lime.

To improve the heat balance of the process, the temperature of the underflow 142 and wash water 116 are preferably maintained at a temperature of at least about 60° C., more preferably of at least about 65° C., and even more preferably of at least about 70° C., using steam 120 from pressure oxidation 122 to preheat the wash water 116 (such as in a heat exchanger) before its use in the CCD circuit. It is to be understood, however, that preheating of the wash water 116 is not necessary to the effectiveness of the process in recovering precious metals. This is so because silver jarosite appears to form during hot curing.

Solid-phase reactive sulphate in the underflow 142 is decomposed in the next step 146 to form a decomposed treated slurry 194. In this step, preferably at least most, more preferably at least about 75%, and even more preferably at least about 85% of the solid-phase reactive sulphate is decomposed. Typically, at least about 90% and even more typically at least about 95% of the solid-phase reactive sulphate in the underflow 142 is in the form of jarosites as a result of basic ferric sulphate decomposition during the hot curing step. As set forth in the equation above, jarosites are converted into gypsum and ferric hydroxides. The decomposition is caused by the reaction of a strong acid consumer, such as lime, with jarosites. Decomposition of the jarosite renders silver recoverable by lixiviants, such as cyanide. Preferably, after the decomposition step 146, no more than about 25%, and more preferably no more than about 10%, of the iron in the decomposed treated slurry 194 is in the form of solid-phase reactive sulphate (or jarosites).

Figure 3:
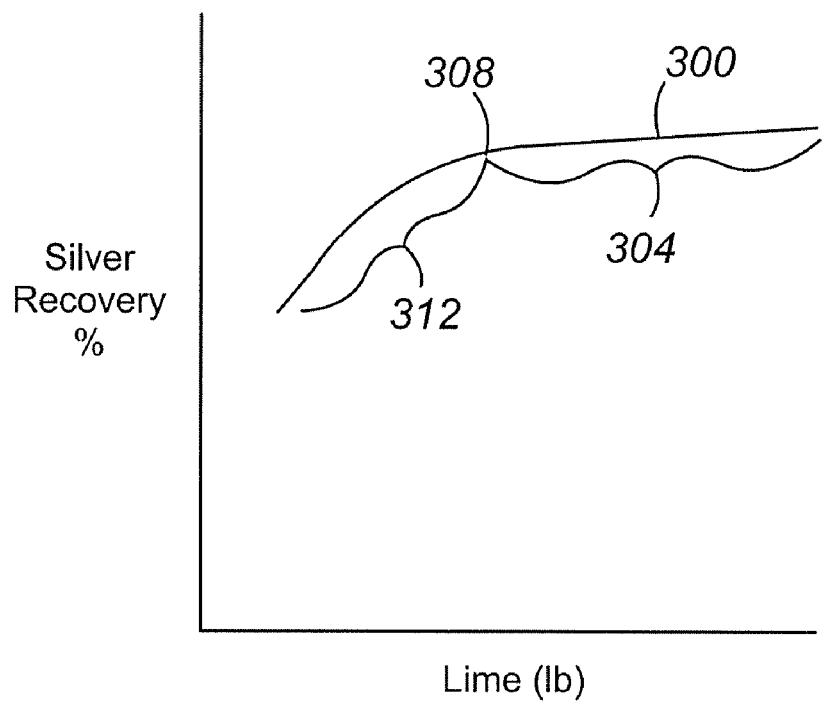
FIG. 3 is a plot of silver recovery against lime consumption.

To reduce operating costs, the amount of acid consumer employed is preferably kept as low as possible for the desired degree of silver recovery. While not wishing to be bound by any theory, FIG. 3 depicts the relationship believed to exist between silver recovery and lime addition. As can be seen from the curve 300, a first portion 304 of the curve is relatively shallow in slope while a second portion 312 is relatively steeply sloping. The preferred operating point 308 is at the intersection of the first and second portions 304 and 312. At this point, the amount of lime consumed for the corresponding degree of silver recovered is substantially optimal from the standpoint of process economics. In a typical application, the amount of acid consumer (lime) corresponding to the point 308 is at least the stoichiometric amount relative to the total sulphate content of the hot cured residue in the underflow. Typically, sufficient acid consumer is added to raise the pH of the underflow to the desired pH level. In absolute terms, the amount of lime-equivalent acid consumer used is preferably no more than about 100 kg/tonne, more preferably in the range of from about 20 to about 80 kg/tonne, and even more preferably in the range of from about 20 to about 60 kg/tonne of residue in the underflow 142. Additional amounts of weak and less expensive acid consumers, such as limestone, may be added to raise the pH of the underflow 142 to the level desired for step 146. Typically, the amount of weak acid consumers added to the underflow from the primary thickener ranges from about 20 to about 40 kg/tonne of residue in the primary thickener underflow. The weak acid consumers are normally added to the thickener underflow before addition of strong acid consumers.

To obtain desired reaction kinetics in the decomposition of solid-phase reactive sulphate, the reaction conditions are carefully controlled. The preferred temperature of the underflow 142 during step 146 is at least about 80° C., even more preferably at least about 90° C., and even more preferably ranges from about 80 to about 100° C. The initial pH of the underflow 142 before step 146 typically ranges from about pH 2 to about pH 5 while the preferred pH of the underflow 142 during step 146 preferably is at least about pH 7, more preferably is at least about pH 9, and even more preferably ranges from about pH 10 to about pH 12. The residence time of the underflow 142 in step 146 preferably ranges from about 0.5 to about 12 hours, more preferably from about 1 to about 3 to about 10 hours, and even more preferably from about 5 to about 8 hours.

Step 146 is preferably performed in a single stage or in multiple stages. Decomposition occurs in a stirred vessel(s) in which the underflow 142 is agitated during decomposition to disperse and suspend the residue in solution. The acid consumer is added while agitating the underflow 142. In one configuration, the strong acid consumer is added as part of the wash water used in the wash circuit. In this configuration, decomposition of basic ferric sulphates occurs, entirely or partially, in the wash circuit. In this configuration, a limestone slurry may be added to raise the pH to a pH in the range of about pH 4 to pH 5 and then lime added to raise the pH to about pH 10.5 or higher.

The precious metals, including both gold and silver, are dissolved by leaching the decomposed treated slurry 194 in the precious metal leach step 170. Leaching is typically performed without additional liquid/solid separation or pulp density adjustment operations being performed on the decomposed treated slurry 194. The leaching agent or lixiviant 174 is typically alkali- or acid-based, with exemplary lixiviants being cyanide, halides (iodide, bromide, chloride), ammonium or sodium thiosulphate, and thiourea. In one configuration, the leach step 170 is performed at atmospheric pressure and under alkaline conditions (at or above a pH of about pH 7) to produce a pregnant leach solution 178 containing (at least) most of the precious metal content of the slurry 194. The precious metal leach step 170 may be done by any suitable technique including using cyanide leaching and Carbon-in-Pulp or CIP techniques, Carbon-In-Leach or CIL techniques, cementation techniques, Resin-in-Pulp or RIP techniques, Resin-In-Leach or RIL techniques, or by circulating a pregnant leach solution and/or slurry through one or more precious metal sorbent columns. In the CIL, CIP, RIP, RIL, and other sorbent-based techniques, a sorbent, such as activated carbon or an ion exchange resin, sorbs the precious metal dissolved in the lixiviant. The sorbed precious metal is stripped from the sorbent by an acidic or alkaline eluant to form a barren sorbent for recycle to the leach step 170 with and/or without regeneration, and a pregnant eluate containing most of the precious metal sorbed on the sorbent.

In the precious metal recovery step 182, the precious metal is recovered from the pregnant leach solution 178 (or pregnant eluate) by suitable techniques, such as electrowinning or cementation followed by smelting, to form the precious metal product 186. When required, the barren solid residue 190 from the leaching step 170 is subjected to cyanide detoxification or destruction and discarded as tailings 162.

Returning to the liquid/solid separation step 138, the overflow 124 is subjected to acid neutralization 146 in which acid consumers, such as carbonate-containing flotation tailing, limestone and lime, are contacted with the overflow 124 to increase the pH from a starting pH of from about pH 0.5 to about pH 1.3 to a final pH of from about pH 4.5 to about pH 10.0. The neutralized slurry at pH over 7.0 is subjected to a liquid/solid separation 150 (which is preferably done by a High Density Sludge or HDS process) to produce a further overflow or liquid fraction 154 and a solid residue 158. Preferably, at least most and more preferably at least about 98% of the dissolved ferric iron and sulphuric acid reports to the overflow 124. This effects a substantial reduction in lime consumption in the neutralization step 166.

The neutralization step 146 is preferably performed in two stages. In the first stage, which can have multiple reactors, free flotation tailing or inexpensive limestone is contacted with the dissolved ferric sulphate and free sulphuric acid to form ferric hydroxide and gypsum. In a second stage to achieve a higher pH, typically at least about 90% of the dissolved ferric sulphate is precipitated. In the second stage which can also have multiple reactors, lime is contacted with the slurry discharged from the first stage of neutralization to reach the final pH normally above 7.0. The solid residue 158 reports to tailings impoundment area 162 while the overflow 154 is recycled to the liquid/solid separation step 138.

EXAMPLES

The ore used for examples 1, 2, and 3 contained the following

| Element | Unit | Concentration |
| --- | --- | --- |
| Au | g/t | 3.46 |
| Ag | g/t | 43.5 |
| S | % | 7.53 |
| Fe | % | 6.14 |
| Chloride | g/t | 230 |

The ore was oxidized in an autoclave at a pulp density of 28% for 1 hour. The autoclave was operated at 100 psi $O_2$ overpressure and 230° C. The solution feed to the autoclave contained 25 g/L free acid as $H_2SO_4$ plus 7.5 g/L $Fe^{3+}$ and 7.5 g/L $Fe^{2+}$. The solid fraction of the autoclave discharge contained 12% sulfate and the solution fraction contained 55 g/L free acid and 10 g/L iron.

Example 1

Autoclave discharge residue containing 12% sulfate in the solids fraction and 55 g/L free acid and 10 g/L iron in the solution was filtered. The solids fraction was washed and repulped in water to a density of 21%. The pH of the re-pulped slurry was adjusted to 10 with 138 kg/t lime (as $Ca(OH)_2$)) and heated with agitation for 6 hours at 90° C. Upon completion of the lime boil step, gold and silver were recovered from the slurry using 24-hour bottle roll Carbon in Leach (CIL) cyanidation with 1 g/L sodium cyanide. Additional lime was not required during cyanidation, therefore the total lime consumption for the lime boil and cyanidation steps was 138 kg/t. The gold and silver recovery was 95.2 and 58.9%, respectively. This example demonstrates the high lime consumption and marginal silver recoveries that occur when conventional lime boiling techniques as taught by U.S. Pat. No. 4,632,701 are employed; that is, when a lime boil is performed in the absence of a hot curing step.

| Autoclave Residue Processing | Total Lime Addition kg/t | Silver Recovery | Gold Recovery |
| --- | --- | --- | --- |
| Liquid solid separation, Repulp, Lime boiling CIL | 138 | 58.9 | 95.2 |

Example 2

Autoclave discharge residue containing 12% sulfate in the solids fraction and 55 g/L free acid, and 10 g/L iron, was hot cured at 90° C. for 16 hours in an agitated tank. The free acid content in the solution portion was reduced from 55 g/L to 30 g/L and the iron content increased from 10 g/L to 30 g/L, during hot curing. The sulfate level in the solid fraction was reduced from 12% to 0.39%. The hot cured slurry was filtered and the solids fraction containing 0.39% sulfate was repulped in water to a density of 23%. Gold and silver were recovered from the slurry using 24-hour bottle roll (CIL) with 1 g/L sodium cyanide. The pH of the repulped slurry was adjusted and maintained at pH 10 with a total of 3.25 kg/t lime (Ca(OH$_2$)) during CIL. Gold and silver recoveries were 94.9% and 0.4% respectively.

This example demonstrates high gold recovery and low lime consumptions which occur when the concentration of basic iron sulfates in the autoclave leach residue is reduced by hot curing as taught by US 2006/0133974.

Due to the formation of insoluble silver species during hot curing, silver recovery is low.

| Autoclave Residue Processing | Lime Addition kg/t | Silver Recovery % | Gold Recovery % |
|---|---|---|---|
| Hot Curing, Liquid Solid Separation, Repulp, CIL | 3.25 | 0.4 | 94.9 |

Example 3

Autoclave discharge residue containing 12% sulfate in the solids fraction and 55 g/L free acid and 10 g/L iron in the solution, was heated with agitation at 90° C. for 16 hours. The free acid content in the solution was reduced from 55 g/L to 30 g/L and the iron content increased from 10 g/lL to 30 g/L. The sulfate level in the residue was reduced from 12% to 0.39%. The hot cured slurry was filtered and the solids containing 0.39% sulfate were repulped with water to a density of 23%. The alkalinity of the slurry was increased by the addition of 29.9 kg/t of lime (Ca(OH$_2$)) and heated for 6 hours at 90° C. in a stirred vessel. Upon completion of the hot alkali treatment step, gold and silver recovery was performed using 24-hour bottle roll CIL with a cyanide strength of 1 g/L. Additional lime was not required during cyanidation; therefore the total lime consumption for the lime boil and cyanidation steps was 29.9 kg/t. The gold and silver recovery was 96.2 and 89.6%, respectively.

This example demonstrates that higher silver recovery (89.6%) can be achieved when the hot cure and hot alkali treatment techniques are used together rather than separately as in examples 1 (58.9%) and 2 (0.4%). The lime required for the lime boiling step is reduced with the advent of hot curing. The conventional lime boil shown in example 1 consumed 138 kg/t lime, over 100 kg/t more than that required when hot alkali treatment was preceded by hot curing.

| Autoclave Residue Processing | Lime Addition kg/t | Silver Recovery | Gold Recovery |
|---|---|---|---|
| Hot Cure, Liquid Solid Separation, Repulp, Hot Alkali Addition, CIL | 29.9 | 89.6 | 96.2 |

Example 4

The feed ore employed for this example contains a lower concentration of silver than the ore used in examples 1, 2, and 3. The composition of the ore is as follows:

| Element | Unit | Concentration |
|---|---|---|
| Au | g/t | 3.2 |
| Ag | g/t | 19.0 |
| S | % | 6.82 |
| Fe | % | 8.29 |
| Chloride | g/t | 191 |

The ore was oxidized in an autoclave at a pulp density of 28% for 1 hour. The autoclave was operated at 100 psi O$_2$ at 230° C. The solution feed to the autoclave contained 25 g/L free acid as H$_2$SO$_4$ plus 7.5 g/L Fe$^{3+}$ and 7.5 g/L Fe$^{2+}$.

The hot cured slurry was filtered and the solids containing 0.81% sulfate were repulped with water to a density of 23%. The alkalinity of the slurry was increased by the addition of 36.5 kg/t of lime (Ca(OH$_2$)) and heated for 6 hours at 90° C. in a stirred vessel. Upon completion of the hot alkali treatment step, gold and silver recovery was performed using 24-hour bottle roll CIL with 1 g/L sodium cyanide. Additional lime was not required during cyanidation, therefore the total lime consumption for the hot alkali treatment and cyanidation steps was 36.5 kg/t. The gold and silver recoveries were 96.1% and 90.5%, respectively. This example shows that the combination of hot curing and hot alkali treatment is effective in recovering silver from residues containing lower silver concentrations.

| Autoclave Residue Processing | Lime Addition kg/t | Silver Recovery | Gold Recovery |
|---|---|---|---|
| Hot Cure Liquid Solid Separation Repulp Hot Alkali Treatment CIL | 36.8 | 90.5 | 96.1 |

Example 5

Further experiments were performed with the following ore samples 3 and 4:

| | | Concentration | |
|---|---|---|---|
| Element | Unit | Sample 3 | Sample 4 |
| Au | g/t | 5.78 | 5.6 |
| Ag | g/t | 22.63 | 26.77 |
| S | % | 7.72 | 10.10 |
| Fe | % | 5.88 | 8.28 |
| Chloride | g/t | 83 | <5 |

In a continuous operation, both ore samples 3 and 4 were oxidized in an autoclave at 41-50% solids at a total pressure of 490 psi, for 50-60 minutes at a temperature ranging from 219 to 230° C. The autoclave discharge was then subjected to hot curing for four hours at 85-100° C. Hot curing reduced the amount of sulfate in the autoclave discharge residue to less than 0.5%, in addition the acid levels were reduced from 31.8 g/L and 40.5 g/L to 11.1 and 15.5 g/L. for samples 3 and 4 respectively. After hot curing, liquid solid separation was performed using counter current decantation. The underflow from CCD was lime boiled at a pH greater than 10.5, and a temperature between 84 and 90° C. for approximately 4 hours. Gold and silver recovery by Carbon in Leach, yielded similarly high silver and gold recoveries with reduced lime consumption, as observed in batch processing shown in example 3. Total lime consumption (lime boil and CIL) for Sample 3 and Sample 4 was 26.7 and 28.2 kg/t with respective silver recoveries of 88.9% and 79.3%.

|  | Sample 3 | Sample 4 |
|---|---|---|
| Autoclave Discharge (Feed to Hot Cure) |  |  |
| Solids % | 41% | 49.2% |
| Sulfate (residue) % | 3.62 (compartment) | 2.85 |
| Sulfate (solution) g/L | 61 | 62 |
| Free Acid g/L | 31.77 | 40.50 |
| Total Iron g/L | 6.83 | 7.18 |
| Ferrous Iron g/L | 0.25 | 0.26 |
| Discharge from Hot Cure |  |  |
| Sulfate (residue) % | 0.4 | 0.31 |
| Sulfate (solution) g/L | 114 | 139 |
| Free Acid g/L | 11.07 | 15.50 |
| Total Iron g/L | 27.60 | 34.12 |
| Ferrous Iron g/L | 0.93 | 1.99 |
| % solids decrease | 15.4 | 14.7 |
| Lime Boil |  |  |
| pH | 10.7 | 11.1 |
| Lime Addition (Lime Boil) kg/t | 24 | 25 |
| Total Lime Addition kg/t | 27.6 | 28.2 |
| Sulfate (residue) % | 0.34 | 0.22 |
| Gold Recovery % | 93.2 | 97.5 |
| Silver Recovery % | 88.9 | 78.3 |

These experiments show that high silver recoveries can be obtained at reasonable and economic levels of lime addition when a hot cure precedes lime boiling and that hot curing of the pressure oxidation residue can be quite effective in dissolving solid-phase sulphates, whether or not reactive, into the liquid phase.

A number of variations and modifications of the invention can be used. It would be possible to provide for some features of the invention without providing others.

For example, in one alternative embodiment, the liquid/solid separation step 138 is omitted. Rather, a two-step neutralization process is performed, with the second neutralization step also causing decomposition of solid-phase reactive sulphate. In this embodiment, the first step of the neutralization is performed using a weak and less expensive acid consumer, such as limestone, to react with substantially all, and even more preferably, at least about 90% of the dissolved ferric sulphates and sulphuric acid to form, in the latter case, gypsum. In the second step, a strong acid consumer, with lime being preferred, is contacted with the partially neutralized slurry to react with any remaining dissolved ferric sulphate and sulphuric acid and decompose basic ferric sulphates and jarosites. Liquid/solid separation may thereafter be performed to remove the residue in the underflow. Alternatively, the decomposed slurry may be subjected to precious metal recovery in the absence of liquid/solid separation.

In another embodiment, gold leaching and/or recovery precede the decomposition step 194. In this embodiment, the underflow 142 is neutralized with a weak acid consumer, such as limestone, to raise the pH to at least about pH 7. The gold is then leached using a suitable lixiviant to dissolve most of the gold in a pregnant leach solution. The pregnant leach solution is separated from the residue. Gold is recovered from the pregnant leach solution while the residue is contacted with a strong acid consumer, such as lime, and heated to at least about 80° C. to decompose basic ferric sulphates and jarosites and render silver amenable to leaching. The silver is then leached using a suitable lixiviant and recovered from the pregnant leach solution by known techniques.

The present invention, in various embodiments, includes components, methods, processes, systems and/or apparatus substantially as depicted and described herein, including various embodiments, subcombinations, and subsets thereof. Those skilled in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process for the enhanced recovery of silver from autoclave discharge, comprising:
    oxidizing an aqueous feed slurry in an autoclave to form an aqueous discharge slurry, the feed slurry comprising a silver-containing material and sulphide sulphur, wherein at least most of the sulphide sulphur is oxidized in the autoclave to sulphate sulphur and wherein at least a portion of the sulphate sulphur is in the form of a solid-phase reactive sulphate, the solid-phase reactive sulphate comprising iron and silver;
    removing, from the autoclave, the aqueous discharge slurry comprising discharge solids and aqueous discharge liquid, the discharge solids comprising silver and at least most of the solid-phase reactive sulphate and wherein a liquid phase of the aqueous discharge slurry comprises an acid;

hot curing the aqueous discharge slurry to allow at least most of the iron-containing solid-phase reactive sulphates in the discharge solids to react with the acid in the aqueous discharge slurry to form liquid-phase iron-containing reactive sulphate, wherein, after the hot curing step, at least a portion of the solid-phase reactive sulphate comprises silver and the discharge solids have a total solid-phase reactive sulphate content of no more than about 2 wt %;

after the hot curing step, contacting the discharge solids with a strong acid consumer while maintaining a temperature of the discharge solids to greater than about 80°C. to convert at least most of the remaining iron-containing solid-phase reactive sulphate to a nonreactive iron-containing species and to decompose at least most of the silver-containing solid-phase reactive sulphate to a soluble form of silver, wherein an amount of the strong acid consumer used is no more than about 100 kg/tonne of the discharge solids, and wherein after the contacting step no more than about 25% of the iron in the discharge solids is in the form of solid-phase reactive sulphate; and thereafter recovering at least most of the silver from the discharge solids.

2. The process of claim 1, wherein the solid-phase reactive sulphate comprises basic ferric sulphate, the liquid-phase reactive sulphate comprises dissolved ferric sulphate, the nonreactive iron-containing species comprises iron hydroxide, and the acid comprises sulphuric acid, wherein, in the hot curing step, the temperature of the aqueous discharge slurry is maintained at greater than 60 degrees Celsius, and wherein, in the hot curing step, the aqueous discharge slurry is held in a stirred vessel and further comprising:

after the hot curing step and before the thereafter recovering step, separating at least a portion of the liquid phase of the aqueous discharge slurry from the discharge solids, wherein the solid-phase reactive sulphate comprises basic ferric sulphates and wherein, in the thereafter recovering step, at least most of the basic ferric sulphates are converted into dissolved ferric sulphate according to the following equation:

3. The process of claim 1, wherein the solid-phase reactive sulphate comprises basic iron sulphate, the liquid-phase reactive sulphate comprises ferric sulphate, the nonreactive iron-containing species comprises iron hydroxide, and the acid comprises sulphuric acid, wherein the strong acid consumer used in the contacting step is predominantly lime, wherein, in the hot curing step, greater than about 90% of the solid-phase reactive sulphate is converted into liquid-phase reactive sulphate, and wherein, in the contacting step, a pH of the discharge solids is increased to a pH in the range of from about pH 9.0 to about pH 12.0, and further comprising:

contacting dissolved ferric sulphate in the aqueous discharge slurry with a second acid consumer different from the strong acid consumer used in the contacting step to convert at least most of the dissolved ferric sulphate to ferric hydroxide.

4. The process of claim 1, wherein, after the hot curing step, the aqueous discharge slurry comprises from about 50 to about 150 g/l liquid-phase reactive sulphate, no more than about 5 wt. % solid-phase reactive sulphate, and from about 10 to 140 g/l sulphuric acid, and wherein the aqueous discharge slurry comprises no more than about 0.5 wt. % basic ferric sulphate.

5. The process of claim 1, wherein in the contacting step the strong acid consumer is lime and an amount of lime contacted with the discharge solids is no more than about 60 kg/tonne, wherein greater than about 10 % of the solid-phase reactive sulphates present before the contacting step is in the form of argentojarosite.

6. The process of claim 1, further comprising after the hot curing step and before the contacting step:

separating at least most of the discharge liquid phase from the discharge solids, the discharge liquid comprising most of the liquid-phase reactive sulphate and acid and the discharge solids comprising most of the solid-phase reactive sulphate;

contacting the discharge liquid with an acid consumer to neutralize the liquid-phase reactive sulphate and the acid; and washing, by a wash solution, the discharge solids, wherein the wash solution comprises an acid consumer to neutralize most of any remaining liquid-phase reactive sulphate and acid, wherein a total amount of acid consumer contacted, in the contacting step, with the discharge solids ranges from about 20 to about 60 kg/tonne of the discharge solids.

7. The process of claim 6, wherein a total amount of lime equivalent acid consumer contacted, in the contacting step, with the discharge solids ranges from about 20 to about 60 kg/tonne of the discharge solids after the hot curing step and before the contacting step, wherein the silver-containing material comprises gold and wherein the thereafter recovering step comprises the substeps:

contacting the discharge solids with a lixiviant to dissolve, in a pregnant leach solution, at least most of the silver and gold in the discharge solids; and recovering at least most of the dissolved silver and gold from the pregnant leach solution.

8. The process of claim 1, wherein, in the contacting step, the discharge solids are in a slurry having a pH of at least about pH 10 and a temperature of at least about 90° C., and wherein the amount of lime equivalent acid consumer contacted with the discharge solids ranges from about 20 kg/tonne to about 60 kg/tonne.

9. The process of claim 6, wherein, in the separating and liquid phase contacting steps, the discharge solids are maintained at a temperature greater than about 60° C.

10. The process of claim 6, further comprising before the oxidizing step:

contacting at least a portion of the separated aqueous discharge liquid with the silver-containing material, wherein the at least a portion of the separated aqueous discharge liquid comprises liquid-phase reactive sulphate and free sulphuric acid to partially oxidize sulphide sulphur in the material prior to the oxidizing step.

11. A process for the enhanced recovery of silver from autoclave discharge, comprising:

oxidizing, in an autoclave, sulphide sulphur in an aqueous feed slurry, to form an aqueous discharge slurry, the aqueous feed slurry comprising a precious metal-containing material, wherein at least most of the sulphide sulphur is oxidized to sulphate sulphur, wherein the precious metal comprises silver and gold, and wherein at least a portion of the sulphate sulphur is in the form of a solid-phase reactive sulphate, the solid-phase reactive sulphate comprising iron as basic ferric sulphate and silver as argentojarosite;

removing, from the autoclave, the aqueous discharge slurry comprising discharge solids and aqueous discharge liquid, the discharge solids comprising at least a portion of the precious metal and at least most of the solid-phase reactive sulphate, and wherein a liquid phase of the aqueous discharge slurry comprises sulphuric acid;

hot curing the aqueous discharge slurry to allow greater than about 90% of the basic ferric sulphate in the discharge solids to react with the sulphuric acid to form ferric sulphate dissolved in the aqueous discharge liquid, the discharge solids having, after the hot curing step, a total solid-phase reactive sulphate content of no more than about 2 wt %;

thereafter separating the aqueous discharge liquid from the discharge solids, wherein at least most of the dissolved ferric sulphate and remaining acid are in the separated aqueous discharge liquid;

contacting the separated discharge solids with a strong acid consumer to decompose the remaining basic ferric sulphate to an iron oxide, and to decompose the argentojarosite, wherein a total amount of lime equivalent acid consumer contacted, in the contacting step, with the discharge solids ranges from about 20 to about 60 kg/tonne of the discharge solids and wherein after the contacting step no more than about 25 % of the iron in the discharge solids is in the form of solid-phase reactive sulphate;

thereafter contacting a lixiviant, at a pH greater than about pH 7.0, with the discharge solids to dissolve at least most of the silver and gold in the discharge solids; and recovering the dissolved silver and gold.

12. The process of claim 11, wherein the strong acid consumer comprises lime, and wherein, in the separating step, the discharge solids are maintained at a temperature of greater than about 80° C. and in a liquid phase having a pH of greater about pH 9, and wherein, in the hot curing step, the temperature of the aqueous discharge slurry is maintained at or greater than 60 degrees Celsius.

13. The process of claim 11, wherein the strong acid consumer is lime and wherein no more than about 60 kg/tonne of acid consumer is contacted with the discharge solids in the contacting step and further comprising:

contacting dissolved ferric sulphate in the aqueous discharge liquid with lime and/or limestone to convert at least most of the dissolved ferric sulphate to ferric hydroxide.

14. The process of claim 11, wherein, in the separating step, the discharge solids are maintained at a temperature of greater than about 60° C., wherein, after the hot curing step, the aqueous discharge slurry comprises from about 50 to about 150 g/L dissolved ferric sulphate, no more than about 1 wt % solid-phase reactive sulphate, no more than about 0.5 wt. % basic ferric sulphate, from about 10 to about 50 g/L ferric ion, and from about 10 g/L to about 40 g/L sulphuric acid, wherein the aqueous discharge liquid comprises greater than about 80% of the dissolved ferric iron in the aqueous discharge slurry after the hot curing step, wherein the separated aqueous discharge liquid comprises no more than about 1 wt % solids, and wherein the separated aqueous discharge solids comprise no more than about 70 wt % liquid.

15. A process for the enhanced recovery of silver from autoclave discharge, comprising:

oxidizing sulphide sulphur in an aqueous feed slurry in an autoclave to form an aqueous discharge slurry, the aqueous feed slurry comprising a silver-containing material, wherein at least most of the sulphide sulphur is oxidized to sulphate sulphur and wherein at least a portion of the sulphate sulphur is in the form of a solid-phase reactive sulphate, the solid-phase reactive sulphate comprising iron as basic sulphate and silver as argentojarosite;

removing, from the autoclave, the aqueous discharge slurry comprising discharge solids and aqueous discharge liquid, the discharge solids comprising at least most of the solid-phase reactive sulphate, and wherein a liquid phase of the aqueous discharge slurry comprises sulphuric acid;

hot curing the aqueous discharge slurry to allow greater than about 85% of the iron-containing solid-phase reactive sulphate in the discharge solids to react with the sulphuric acid to form liquid-phase reactive sulphate as dissolved ferric sulphate in the aqueous discharge liquid, the discharge solids after the hot curing step having a total solid-phase reactive sulphate content of no more than about 2 wt %;

thereafter separating the aqueous discharge liquid from the discharge solids, wherein at least most of the liquid-phase reactive sulphate and remaining acid are in the separated aqueous discharge liquid;

contacting the separated discharge solids with lime to decompose at least most of the silver containing argentojarosite, wherein an amount of the lime used is no more than about 100 kg/tonne of the discharge solids, and wherein after the contacting step no more than about 25% of the iron in the discharge solids is in the form of solid-phase reactive sulphate;

thereafter contacting a lixiviant, at a pH greater than about pH 7.0, with the discharge solids to dissolve at least most of the silver in the solids; and recovering the dissolved silver.

16. The process of claim 15, wherein, in the contacting step, the discharge solids are maintained at a temperature of greater than about 80° C. and in a liquid phase having a pH of greater than about pH 9, and wherein, in the separating step, the temperature of the discharge slurry is maintained at or greater than 60 degrees Celsius.

17. The process of claim 15, wherein no more than about 60 kg/tonne of lime is contacted with the discharge solids in the contacting step and further comprising:

contacting liquid-phase reactive sulphate in the aqueous discharge liquid with lime and/or limestone to convert at least most of the dissolved ferric sulphate to ferric hydroxide.

18. The process of claim 15, wherein, in the separating step, the discharge solids are maintained at a temperature of greater than about 85° C. and wherein, after the hot curing step, the aqueous discharge slurry comprises from about 50 to about 150 g/L liquid-phase reactive sulphate, no more than about 1 wt % solid-phase reactive sulphate, and from about 10 g/L to about 40 g/L sulphuric acid.

19. The process of claim 15, wherein during the separating step, a second acid consumer other than lime is contacted with the discharge solids and wherein a total amount of lime-equivalent acid consumer contacted, in the contacting step, with the discharge solids ranges from about 20 to about 60 kg/tonne of the discharge solids.

20. The process of claim 19, wherein the second acid consumer is limestone.

21. The process of claim 15, further comprising before the oxidizing step:

contacting at least a portion of the separated aqueous discharge liquid with unoxidized precious metal-containing material, wherein the separated aqueous discharge liquid comprises liquid-phase reactive sulphate and free sulphuric acid to partially oxidize sulphide sulphur in the unoxidized material.

22. The process of claim 15, wherein the duration of the hot curing step is greater than about 6 hours and wherein a total amount of lime-equivalent acid consumer contacted, in the contacting step, with the discharge solids ranges from about 20 to about 60 kg/tonne of the discharge solids.

23. The process of claim 15, wherein the duration of the hot curing step is greater than about 12 hours and wherein a total amount of lime-equivalent acid consumer contacted, in the contacting step, with the discharge solids ranges from about 20 to about 60 kg/tonne of the discharge solids.

24. The method of claim 1, wherein the autoclave is operated under conditions favoring the formation of basic ferric sulphate and disfavoring the formation of hematite.

25. The method of claim 11, wherein the autoclave is operated under conditions favoring the formation of basic ferric sulphate and disfavoring the formation of hematite.

26. The method of claim 15, wherein the autoclave is operated under conditions favoring the formation of basic ferric sulphate and disfavoring the formation of hematite.

27. The method of claim 1, wherein, in the contacting step, greater than about 75% of the solid-phase reactive sulphate is converted to the nonreactive iron-containing species, wherein greater than about 90% of the solid-phrase reactive sulphate is in the form of jarosites.

28. The method of claim 15, wherein, in the hot curing step, an amount of lime required to decompose at least most of the argentojarosite is substantially lower than an amount of lime required to decompose at least most of the argentojarosite using conventional lime boiling techniques.

29. The method of claim 15, wherein the aqueous discharge slurry, after the hot curing step comprises dissolved ferric iron and metal sulphates, wherein the separated aqueous discharge liquid includes greater than about 90% of the dissolved ferric iron, wherein the separated discharge solids comprise no more than about 10% of the dissolved metal sulphates and free sulphuric acid and at least most of the silver in the aqueous discharge slurry, after the hot curing step.

30. The method of claim 1, wherein, in the contacting step, the discharge solids are in a slurry having a pH of at least about pH 7 and a temperature of at least about 80° C.

31. The method of claim 11, wherein, in the contacting step, the discharge solids are in a slurry having a pH of greater than about pH 9 and a temperature of at least about 90° C.

32. The method of claim 15, wherein, in the contacting step, the discharge solids are in a slurry having a pH of from about pH 10 to about pH 12 and a temperature from about 80° C. to about 100° C.

* * * * *